United States Patent [19]

Inagami et al.

[11] Patent Number: 4,803,620
[45] Date of Patent: Feb. 7, 1989

[54] MULTI-PROCESSOR SYSTEM RESPONSIVE TO PAUSE AND PAUSE CLEARING INSTRUCTIONS FOR INSTRUCTION EXECUTION CONTROL

[75] Inventors: Yasuhiro Inagami, Kodaira; Takayuki Nakagawa, Kokubunji; Shigeo Nagashima, Hachioji, all of Japan

[73] Assignee: Hitachi, Ltd., Tokyo, Japan

[21] Appl. No.: 445

[22] Filed: Jan. 5, 1987

[30] Foreign Application Priority Data

Jan. 8, 1986 [JP] Japan .................................... 61-563

[51] Int. Cl.[4] ........................ G06F 9/30; G06F 15/16
[52] U.S. Cl. ................................................. 364/200
[58] Field of Search ... 364/200 MS. File, 900 MS File

[56] References Cited

U.S. PATENT DOCUMENTS

| | | | |
|---|---|---|---|
| 3,678,467 | 7/1972 | Nussbaum et al. | 364/200 |
| 3,810,119 | 5/1974 | Zieve et al. | 364/200 |
| 4,502,116 | 2/1985 | Fowler et al. | 364/200 |
| 4,547,849 | 10/1985 | Louie et al. | 364/200 |
| 4,663,708 | 5/1987 | Taub | 364/200 |

FOREIGN PATENT DOCUMENTS 0042442 7/1981 European Pat. Off. .
0123337 10/1984 European Pat. Off. .

OTHER PUBLICATIONS

"Interfacing the 32081 as a Floating Point Peripheral", New Electronics, vol. 18, No. 19, Oct. 1985, pp. 66-72.
"An efficient softwave driver for Am9511 Arithmetic Processor Implementation", IEEE Micro, vol. 4, No. 3, Jun. 1984, pp. 7-19 .
Patent Abstracts of Japan, vol. 6, No. 195 (P-146)[1073], Oct. 5, 1982 & JP-A-57105070 (Fujitsu K.K.), 06-30-1982.

Primary Examiner—Eddie P. Chan
Attorney, Agent, or Firm—Antonelli, Terry & Wands

[57] ABSTRACT

A multi-processor system including a main storage for storing instructions and data, a master processor for supplying to a slave processor data required for the processing to be executed by the slave processor and commanding initiation of the processing, the master processor further operating to test the operation state of the slave processor and perform processing by utilizing the result of the processing executed by the slave processor. The slave processor initiates the processing under the command of the master processor and operates to inform of the master processor of completion of the processing. The slave processor operates to execute a pause instruction for suspending temporarily activation of processing for a succeeding instruction and setting a pause indication at an indicator of the slave processor. When the pause indication is set in the slave processor, the master processor operates to reset this indication to release the slave processor from the pause state. When the pause state indication is not set, the master processor executes a clearing instruction supplied from the main storage for suspending the function to activate the succeeding instruction. The slave processor also operates to set at the indicator an indication instruction indicating completion of execution of the succedding instruction. The master processor functions to reset the indication of completed execution of instruction set at the slave processor and otherwise execute an indication resetting instruction for suspending activation of a succeeding instruction.

9 Claims, 9 Drawing Sheets

FIG. 2

| NO. | ITEMS | MNEMONIC OF INSTRUCTION | CONTENTS OF PROCESSING |
|---|---|---|---|
| 1 | ACTIVATION OF VECTOR PROCESSING | EXVP | ACTIVATION OF VECTOR PROCESSING UNIT BY INFORMING VECTOR INSTRUCTION STRING, NUMBER OF VECTOR ELEMENTS TO BE PROCESSED. |
| 2 | STATE TEST OF VECTOR PROCESSING UNIT | TVP | STATE TEST OF VECTOR PROCESSING UNIT, THE RESULT BEING REFLECTED ONTO CONDITION CODE. STATE IS EITHER OPERATING STATE OR IDLE STATE. |
| 3 | SETTING OF ADDRESS REGISTER | MVVBR MVVIR | TRANSFER OF DATA FROM GENERAL PURPOSE REGISTER IN SCALAR PROCESSING UNIT TO VBR, VIR IN VECTOR PROCESSING UNIT |
| 4 | SETTING OF SCALAR DATA | MVSG MVSF | TRANSFER OF DATA FROM GENERAL PURPOSE REGISTER OF FLOATING POINT REGISTER IN SCALAR PROCESSING UNIT TO SCALAR REGISTER IN VECTOR PROCESSING UNIT |
| 5 | READING OF SCALAR DATA | MVGS MVFS | TRANSFER OF DATA TO GENERAL PURPOSE REGISTER OR FLOATING POINT REGISTER IN SCALAR PROCESSING UNIT, FROM SCALAR REGISTER IN VECTOR PROCESSING UNIT |

FIG. 3

```
STATEMENT
IDENTIFYING          :
  NUMBER             :
     1        S = 0.0
     2        DO 10  I = 1, 100
     3        A(I) = B(I) + C(I)
     4        S = S + A(I)
     5        P(I) = S + Q(I)
     6     10 CONTINUE
     7        X = S + Z
                     :
```

FIG. 4a

| SCALAR INSTR. ID | INSTRUCTION | | COMMENTS |
|---|---|---|---|
| S1 | MVSF | SR0, FR0 | SET INITIAL VALUE IN ZEROTH SCALAR REGISTER |
| S2 | SVBR | VB0 | } SET ADDRESS INFORMATION FOR ARRAY B |
| S3 | SVIR | VIR0 | |
| S4 | SVBR | VBR1 | } SET ADDRESS INFORMATION FOR ARRAY C |
| S5 | SVIR | VIR1 | |
| S6 | SVBR | VBR2 | } SET ADDRESS INFORMATION FOR ARRAY A |
| S7 | SVIR | VIR2 | |
| S8 | SVBR | VBR3 | } SET ADDRESS INFORMATION FOR ARRAY Q |
| S9 | SVIR | VIR3 | |
| S10 | SVBR | VBR4 | } SET ADDRESS INFORMATION FOR ARRAY P |
| S11 | SVIR | VIR4 | |
| S12 | EXVP | | ACTIVATE VECTOR PROCESING UNIT |
| S13 | TVP | | } TEST STATE OF VECTOR PROCESSING UNIT, AND CONTINUE LOOP-PROCESSING UNTIL IT HAS BECOME IDLE STATE |
| S14 | BC | | |
| S15 | MVFS | FR0, SR0 | } RESULT OBTAINED BY THE VECTOR PROCESSING UNIT IS TRASFERRED TO FLOATING POINT REGISTER OF SCALAR PROCESSING UNIT |

* FR : FLOATING POINT REGISTER
** SR : SCALAR REGISTER

FIG. 4b

| VECTOR INSTR. ID | | INSTRUCTION | COMMENTS |
|---|---|---|---|
| V1 | VL | VR0,VBR0,VIR0 | LOAD ARRAY B IN ZEROTH VECTOR REGISTER |
| V2 | VL | VR1,VBR1,VIR1 | LOAD ARRAY C IN 1ST VECTOR REGISTER |
| V3 | VEA | VR2,VR0,VR1 | ADD B AND C TO OBTAIN A |
| V4 | VSM | SR0,VR2 | SUM ARRAYS A, AND OBTAIN THE RESULTS IN ZEROTH SCALAR REGISTER |
| V5 | VST | VR2,VBR2,VIR2 | STORE ARRAY A |
| V6 | VL | VR3,VBR3,VIR3 | LOAD ARRAY Q IN ZEROTH VECTOR REGISTER |
| V7 | VEM | VR4,VBR,VR0 | MULTIPLY ARRAY Q WITH S TO OBTAIN ARRAY P |
| V8 | VST | VR4,VBR4,VIR4 | STORE ARRAY P |

(NOTES)
VR ..... VECTOR REGISTER
SR ..... SCALAR REGISTER
VBR ..... VECTOR BASE REGISTER
VIR ..... VECTOR INCREMENT REGISTER

VL ..... VECTOR LOAD
VST ..... VECTOR STORE
VEA ..... VECTOR ELMENTWISE ADD
VSM ..... VECTOR SUM
VEM ..... VECTOR ELEMENTWISE MULTIPLY

FIG. 5a

| SCALAR INSTR. ID | INSTRUCTION | | COMMENTS |
|---|---|---|---|
| | | | |
| S1 | MVSF | SR0, FR0 | SET VALUES IN SCALAR REGISTER |
| S2 | SVBR | VBR0 | } SET ADDRESS INFORMATION FOR ARRAY B |
| S3 | SVIR | VIR0 | |
| S12 | EXVP | | } ACTIVATE VECTOR PROCESSING |
| S4 | SVBR | VBR1 | } SET ADDRESS INFORMATION FOR ARRAY C |
| S5 | SVIR | VIR1 | |
| S101 | RSMVP | | } RELEASE VECTOR PROCESSING UNIT FROM PAUSE |
| S6 | SVBR | VBR2 | } SET ADDRESS INFORMATION FOR ARRAY A |
| S7 | SVIR | VIR2 | |
| S8 | SVBR | VBR3 | } SET ADDRESS INFORMATION FOR ARRAY Q |
| S9 | SVIR | VIR3 | |
| S10 | SVBR | VBR4 | } SET ADDRESS INFORMATION FOR ARRAY P |
| S11 | SVIR | VIR4 | |
| S103 | RSMVP | | } RELEASE VECTOR PROCESSING UNIT FROM PAUSE |
| S102 | TRB | | |
| S15 | MVFS | FR0, SR0 | } TAKE OUT RESULT DETERMINED BY VECTOR PROCESSING UNIT TO FLOATING POINT REGISTER OF SCALAR PROCESSING UNIT |

FIG. 5b

| VECTOR INSTR. ID | INSTRUCTION | | COMMENTS |
|---|---|---|---|
| V1 | VL | VR0, VBR0, VIR0 | LOAD ARRAY B IN ZEROTH VECTOR REGISTER |
| V101 | VPPAU | | PAUSE INSTRUCTION ACTIVATION |
| V2 | VL | VR1, VBR1, VIR1 | LOAD ARRAY C IN 1ST VECTOR REGISTER |
| V3 | VEA | VR2, VR0, VR1 | ADD B WITH C, A BEING OBTAINED IN 2ND VECTOR REGISTER |
| V102 | VSIG | | COMMANDING TURN-ON OF S-BIT UPON COMPLETION OF SUCCEEDING INSTRUCTION |
| V4 | VSM | SR0, VR2 | SUM ARRAYS A, AND OBTAIN RESULT S IN ZEROTH SCALAR REGISTER |
| V103 | VPPAU | | PAUSE INSTRUCTION ACTIVATION |
| V5 | VST | VR2, VBR2, VIR2 | STORE ARRAY A |
| V6 | VL | VR3, VBR3, VIR3 | LOAD OF ARRAY Q IN 3RD VECTOR REGISTER |
| V7 | VEM | VR3, VR3, SR0 | MULTIPLY ARRAY S WITH Q, AND OBTAIN RESULT P IN 3RD VECTOR REGISTER |
| V8 | VST | VR4, VBR4, VIR4 | STORE ARRAY D |

MULTI-PROCESSOR SYSTEM RESPONSIVE TO PAUSE AND PAUSE CLEARING INSTRUCTIONS FOR INSTRUCTION EXECUTION CONTROL

BACKGROUND OF THE INVENTION

1. Field of the Invention

The present invention relates to a multi-processor system provided with facility for allowing synchronous communications between processors arranged in a master and slave relationship.

2. Description of the Prior Art

For the purpose of accomplishing scientific computations or calculations at an increased speed, there has been developed a high-speed processor for executing at a high speed the arithmetic operations for those arrays which occur at a high frequency in the scientific calculation. The system or processing the arithmetic operations for the arrays at a high speed may be generally classified into two categories, i.e., a vector processor designed for processing one-dimensional vectors through pipeline at a high speed and a parallel processing system including a plurality of processors arranged in parallel with one another for executing processings in parallel. Although the application of the present invention is not restricted to the vector processor or the parallel processor, it seems convenient to elucidate the problems of the hitherto known systems in conjunction with the vector processor for facilitating the understanding of the underlying concept of the present invention.

The vector processor includes a vector processing mechanism for processing through pipeline at a high speed a series of array data (vector data) ordered in a sequence. However, it is not possible to process all the vector data with a single program. There exist those data which can only be processed through sequential processing (referred to as the scalar processing) as in the case of conventional general purpose computer. Under the circumstances, the vector processor includes in addition to the vector processing mechanism for pipeline-processing of the vector data at a high speed a scalar processing mechanism for realizing the function analogous to that of the hitherto known general purpose computer. Concerning the relationship to be established between the vector processing mechanism and the scalar processing mechanism incorporated in the vector processor, several approaches may be conceived. In many vector processors, however, the vector processing mechanism is physically separated from the scalar processing mechanism.

As an example of the processor incorporating the Vector processing mechanism and the scalar processing mechanism described above, there can be mentioned a processor disclosed in Japanese Patent Unexamined Publication No. 58-114274. The vector processor disclosed in this publication is composed of a scalar processing unit corresponding to the aforementioned scalar processing mechanism and a vector processing unit corresponding to the vector processing mechanism mentioned above.

More specifically, in the case of the processor system disclosed in Japanese Patent Unexamined Publication 58-114274, the vector processor is activated only after a previous or preparatory setting procedure such as loading of address data required for the vector processing in registers incorporated in the vector processor which has been executed by the scalar processor. Upon completion of the vector processing, the vector processor informs the scalar processor of the completion of vector processing by issuing an interrupt to the scalar processor or by taking advantage of the test performed by the scalar processor. On the other hand, the scalar processor executes predetermined scalar processing by utilizing the results of the vector processing. In this manner, in the case of this known system, all the data required for the vector processing are placed in the vector processor before activation of the latter. It is however noted that each of the vector instructions commanding the vector processing does not require all the data to be supplied from the scalar processor. Thus, execution of a vector instruction which requires only a part of the data supplied from the scalar processor involves a problem of wasteful loss of time (dead time), because the execution of such a vector instruction is allowed only after all the data have been set.

As described above, the scalar processor can perform the scalar processing after completion of the vector processing in the vector processor by utilizing the results of the vector processing. In this connection, it is also noted that each of the scalar instructions commanding the scalar processing does not require all the results of the vector processing. In other words, execution of a scalar instruction which requires only a part of the results of the vector processing has to wait for the completed execution of all the vector processings, which in turn means that wasteful loss of time is involved, giving rise to an additional problem.

SUMMARY OF THE INVENTION

It is therefore an object of the present invention to provide a multi-processor system in which individual processors are imparted with the capability of performing parallel or multiple processings with improved efficiency by providing each processor with apparatus for accomplishing fine synchronous communication control among a number of the processors.

In a multi-processor system including a master processor and at least one slave processor, the slave processor requires for executing a processing operation thereof data made available by the master processor. When the slave processor starts the execution of a first instruction which requires only a first part of data available from the master processor in response to the storing of the first part of data in the slave processor, erroneous operation will take place if a second instruction which is to be executed in succession to the first instruction and requires the setting of a second set of data other than the above mentioned first partial data is started before the other storing of the data. For excluding such erroneous operation, it is necessary to establish, a synchronism or synchronization between the master processor and the slave processor in such a manner that only after completed execution of a certain processing, e.g., a particular instruction in the slave processor, the processing by the slave processor is interrupted until a certain processing by the master processor, e.g., loading of data required for execution of a next instruction in the slave processor has been executed, and then the processing in the slave processor is allowed to be restarted. However, the processing steps which require such synchronization will differ from one to another program. Accordingly, the synchronization has to be established on the instruction basis of the (i.e. instruction by instruction).

In the case of the multi-processor system according to the present invention, the slave processor is imparted with a function capable of executing such an instruction that upon execution of an instruction for stopping temporarily the processing, a stop or pause indication is produced in the slave processor, whereby activation of the slave processor for executing a next instruction is inhibited until the stop or pause indication is reset by the master processor. On the other hand, the master processor is imparted with a function or capability to execute such an instruction with which it is checked whether the stop or pause indication is issued in the slave processor and resets the stop indication when it is issued, while generation of the stop indication is awaited if it is not issued. With this arrangement, synchronization be established between the master processor and the slave processor on the instruction basis. More specifically, it is assumed, by way of example, that the master processor activates the slave processor by storing only the data that is required for executing a certain instruction by the slave processor, which in its turn stops the processing after execution of the aforementioned instruction. The master processor can reset the stop indication issued by the slave processor after having stored the data required for execution of a next instruction to be executed by the slave processor, which can then be activated for executing the next instruction in response thereto. In this way, the time taken for processing can be reduced significantly. It is again assumed that the master processor serves as a scalar processor with the vector processor serving as the slave processor. In that case, even if many processing steps (e.g. 100 steps) are involved in the processing for storing data in the vector processor by the scalar processor, significant reduction in the time taken for the processing can be accomplished by virtue of such arrangement that the vector processor is allowed to start the processing without waiting for the storing of all data from the scalar processor.

In order to make it possible for the master processor to perform a processing by utilizing the interim result of operation executed by the slave processor on the way of the execution, while assuring that the slave processor can continue the operation by using the data initially stored by the master processor to complete the arithmetic operation with high speed or within a short time, it is necessary that the slave processor inform the master processor of execution (patial completion) of the processing performed to a particular step while continuing the processing under execution so that the master processor can utilize as early as possible the result of the processing executed subsequently by the slave processor in continuation. Also in this case, since the particular processing step at which the master processor requires the interim result of the arithmetic operation performed by the slave processor differs from one program to another, it is necessary for the slave processor to inform the master processor of the completion of execution of an instruction on the basis of the instruction.

In the multi-processor system according to the present invention, the slave processor is imparted with a function to execute an instruction for indicating completion of execution of a succeeding instruction by discriminatively detecting the completed execution of the succeeding instruction. The master processor is imparted with a function or capability to execute an instruction for checking whether a completed execution is indicated by the slave processor and to thereby reset the indication of a completed execution if it is issued or otherwise wait for generation of an indication of a completed execution.

When the slave processor the vector processor, during operation thereof, use of the arithmetic unit, vector register and other elements of the vector processor participating in the execution of instructions may differ from one instruction to another. To deal with such situation, the slave processor may be provided with means for storing the decoded result of a succeeding instruction (i.e. information associated with the execution of that instruction) in response to an instruction for identifying the completion of execution of that succeeding instruction, to thereby identify the completion of execution of the instruction. The decoded result is comparatively collated with information produced by the slave processor as a result of completion of execution of that instruction.

With the arrangements described above, the slave processor can perform an arithmetic operation under the command of the master processor and issue indication of completion of execution of a particular instruction, as occasion requires, during the operation. The master processor can detect discriminatively completion of execution of a particular instruction performed by the slave processor to thereby carry out an arithmetic operation by utilizing the results of the arithmetic operation performed by the save processor up to the point in time of issuance of the indication of completion. The overall processing time of the system is shortened significantly. When the master processor is the scalar processor with the slave processor being the vector processor, the scalar processor can perform processing by utilizing the interim result available from the vector processor during the operation in which the time for executing a vector instruction requires a relatively long time. Thus, significant reduction in the processing time can be attained.

Implementation of the aforementioned functions in the master processor and the slave processor can be realized by addition and modification of logic circuits of the conventional processor on a relatively small scale. The synchronization control according to the invention scarcely exerts any serious influence to the instruction sequence adopted heretofore. Accordingly, burden to be borne by language compilers and others due to application of the present invention can be very small.

In summary, in a system including a plurality of processors which are interconnected in master and slave relation, the slave processor can stop the instruction activation processing at any given time point while the master processor can clear or remove the stop or pause. Further, indication of the occurrence of an event in the slave processor can be made on the basis of an instruction. On the other hand, the master processor can stop temporarily the processing until the occurrence of an event is indicated. Besides, fine synchronization control can be effectuated between the master processor and the slave processor on the basis of an instruction. These are the main advantages attendant the present invention.

BRIEF DESCRIPTION OF THE DRAWINGS

These and other objects and advantages of the present invention will become more apparent upon reading the following detailed description taken in conjunction with the drawings, in which:

FIG. 2 is a view for illustrating synthronous communication means in a hithto known multi-processor system;

FIG. 3 is a view showing a FORTRAN program used in conjunction with description of a multi-processor system according to an exemplary embodiment of the invention;

FIGS. 4a and 4b are views for illustrating scalar object codes and vector object codes corresponding to the FORTRAN program shown in FIG. 3 employed in the hitherto known multi-processor system;

FIGS. 5a and 5b are views for illustrating, respectively, scalar object codes and vector object codes corresponding to the FORTRAN program shown in FIG. 3 to be employed in the multi-processor system according to the invention;

DESCRIPTION OF THE PREFERRED EMBODIMENTS

Before entering into detailed description of an exemplary embodiment of the present invention, an arrangement of a hitherto known vector processor will be considered.

Figure 1:
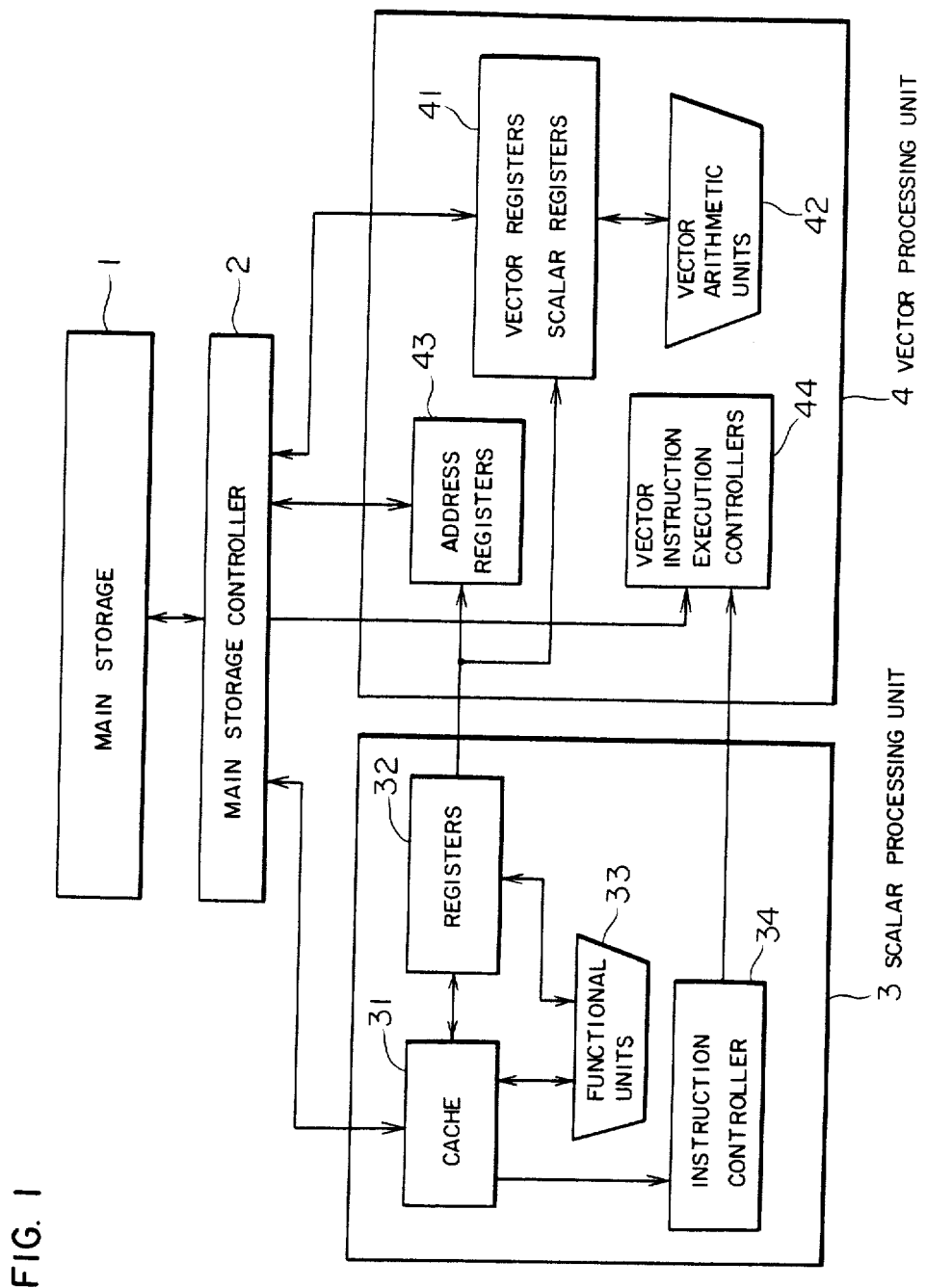
FIG. 1 is a view showing a general arrangement of a vector processor.
Figure 8:
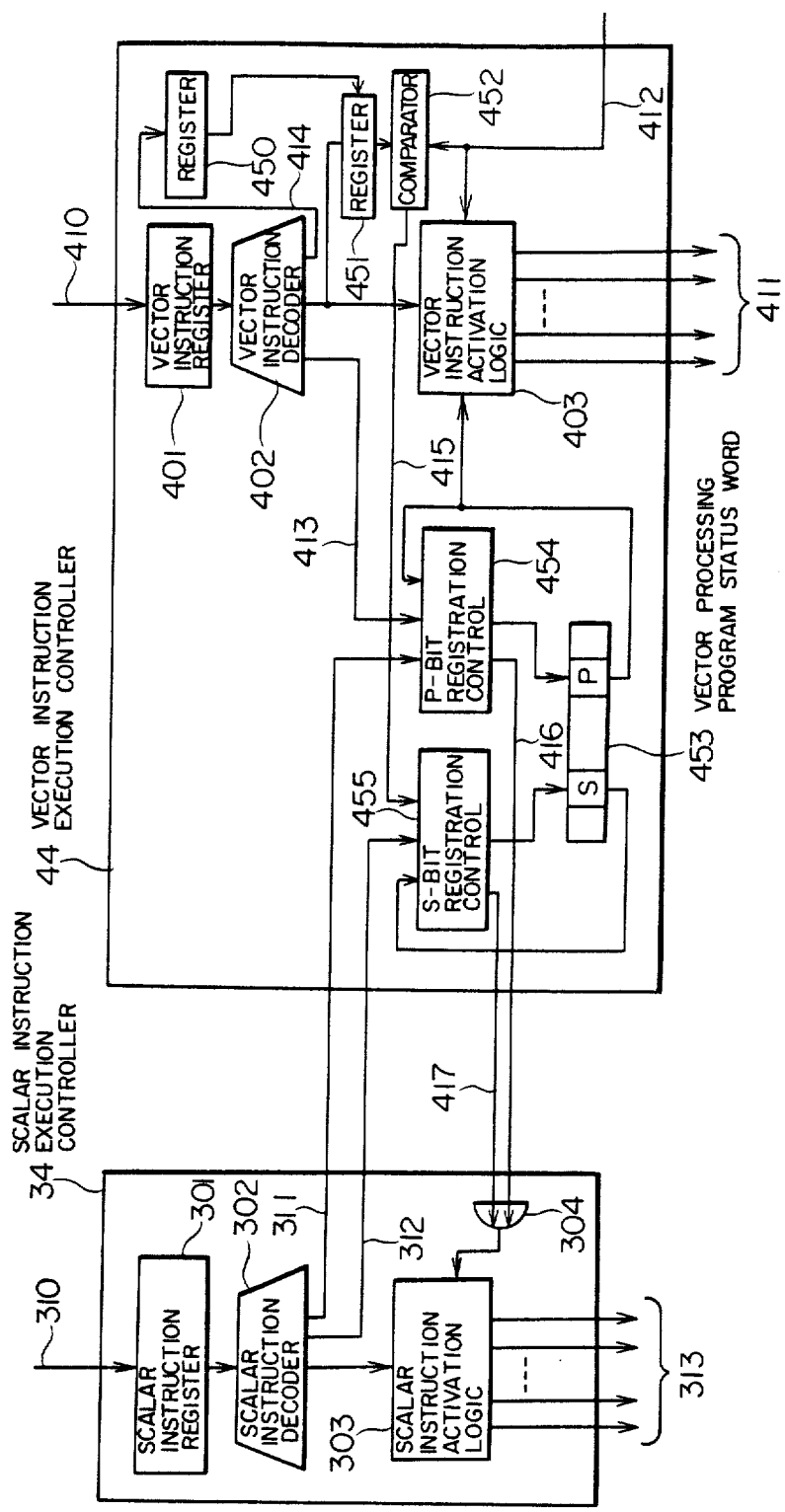
FIG. 8 is a view showing a circuit for carrying out the synchronization control according to the invention.

FIG. 1 is a view showing an arrangement of a vector processor such as disclosed in Japanese Patent Unexamined Publication 58-114274. In this figure, there are shown those portions of the vector processor which are relevant to the invention. It should further be added that the general arrangement of the vector processor to which the invention can be applied is substantially similar to that shown in FIG. 1 and differs from the latter in the respect that a circuit described later on by reference to FIG. 8 is additionally incorporated. Now, referring to FIG. 1, a reference numeral 1 denotes a main storage, 2 denotes a main storage controller, 3 denotes a scalar processing unit and 4 denotes a vector processing unit. A numeral 31 denotes a cache or a high-speed buffer memory for storing a map of a segment of the main storage. A numeral 32 denotes a group of registers which may include, for example, sixteen general purpose registers and sixteen floating point registers. A numeral 33 denotes a group of functional units for performing operations in the scalar processing units. A numeral 34 denotes a scalar instruction controller for performing reading, decoding and controlling the execution of scalar instructions which correspond to those employed in the hitherto known general purpose computer A numeral 41 denotes a group of registers incorporated in the vector processing unit 4 which may include, for example, a group of vector registers and a group of scalar registers. The group of vector registers may include, for example, thirty-two vector registers each of which may hold vector data consisting of 256 elements, by way of example. The scalar register group may include, for example, thirty-two scalar registers each of which is destined to hold scalar data as in the case of the general purpose register and the floating point register incorporated in the scalar processing unit 3. A reference numeral 42 denotes a group of vector arithmetic units for processing by pipeline the data read out from the vector register or the scalar register, the results of the processing being stored in the vector register or scalar register. As the vector operation units, there can be mentioned adders and multipliers. A numeral 43 denotes a group of vector address registers used for indicating location of vector data in the main storage when the vector processing unit 4 reads or writes the vector data from or to the main storage 1. The vector address register is composed of a vector base register (VBR) used for holding the base address of the vector data and a vector increment register (VIR) for holding inter-element space of the vector data. A numeral 44 denotes a vector instruction execution controller for reading and decoding vector instruction and controlling the execution thereof.

Next, description will be made concerning operations of the scalar processing unit and the vector processing unit upon execution of a program.

For performing the vector processing, pre-processing such as previous loading of such data or values to the vector address registers which are used when the vector data is read out from the main storage is required. In the hitherto known vector processor shown in FIG. 1, the vector processing is executed in accordance with the procedure described below.

PROCEDURE 1

In precedence to the start of the vector processing, predetermined values requisite for executing the vector processing are loaded in the vector address registers and the scalar registers in the scalar processing unit.

PROCEDURE 2

Information concerning the base addresses of the main storage where the vector instruction string is stored, the number of elements of the vector data to be processed and the like is sent to the vector processing unit from the scalar processing unit to thereby activate the vector processing unit.

PROCEDURE 3

The activated vector processing unit reads out and executes the vector instructions sequentially in accordance with information sent from the scalar processing unit to perform the vector processing.

PROCEDURE 4

After the vector processing unit has been activated, the scalar processing unit can perform independently other scalar processing such as, for example, preparation for the succeeding vector processing in parallel with execution of the vector processing by the vector processing unit.

PROCEDURE 5

Completion or end of execution of the vector processing in the vector processing unit is dealt with by testing the status of the vector processing unit by the scalar processing unit or by issuing an interrupt to the scalar processing unit from the vector processing unit.

As will be appreciated from the above, the relation between the scalar processing unit and the vector processing unit is such that the former is a master with the latter being a slave, wherein the processing proceeds in such a manner where the vector processing unit executes the vector processing under the command issued by the scalar processing unit.

FIG. 2 shows instructions prepared for allowing synchronous communication between the scalar processing unit and the vector processing unit in the hitherto known processor shown in FIG. 1. All of these instructions are decoded and executed by the scalar processing unit serving as the master processing unit.

Next, taking as the example a simple FORTRAN-program processing, description will be made in what manner the synchronous communication is carried out between the scalar processing unit and the vector processing unit for proceeding with execution of the processings, while making clear the problems as involved.

FIG. 3 is a view showing an example of the FORTRAN program, in which a DO-loop including statements indicated by the statement identifying numbers 2 to 6 is processed in the vector processing unit, while the other statements are processed in the scalar processing unit.

FIGS. 4a and 4b are views showing object programs corresponding to the FORTRAN program shown in FIG. 3. The object programs include scalar object codes to be executed by the scalar processing unit and vector object codes to be executed by the vector processing unit, the scalar object codes being shown in FIG. 4a while the vector object codes are shown in FIG. 4b. In the scalar objects shown in FIG. 4a, eleven scalar instructions ID (identification) labelled with S1 to S11, respectively, are for the preparation processing which is executed in precedence to the vector processing. Among them, ten instructions S2 to S11 are used for loading the address information for arrays A, B, C, P and Q in the program shown in FIG. 3 in the vector base register (VBR) and the vector increment register (VIR) incorporated in the vector processing unit. The instruction S1 is used for placing the initial value 0.0 of a variable S contained in the program shown in FIG. 3 to the scalar register provided in the vector processing unit. The scalar instruction ID designated by S12 (hereinafter expressed in the form such as ID-S12) is used for activating the vector processing by informing the later of the addresses of the main storage where the vector objects shown in FIG. 4b are stored (detailed description in this respect is omitted). In response thereto, the vector processing unit executes sequentially the instructions shown in FIG. 4b as vector objects. The scalar instruction ID-S13 is used for testing whether the vector processing unit is in the operating state or in the idle state, the result of this test being reflected to the condition code. (This instruction is referred to as the vector processor test instruction.) When the vector processing unit is in the operating state, this means that execution of the activated vector processing is not completed yet. In this case, a BC instruction (branch-on-condition instruction) designated by S14 is activated to be looped to the instruction ID-S13, whereby the completion of the vector processing is waited for. At the end of the processing performed by the vector processing unit, the results of the summing operation (the variable S in the program shown in FIG. 3) placed in the scalar register at the zeroth address in the vector processing unit is transferred to the floating point register at the zeroth address in the scalar processing unit to be utilized in the succeeding operation (refer to the statement identified by the number 7 in the program shown in FIG. 3).

The processing performed with the aid of the synchronous communication unit effected between the scalar processing unit and the vector processing unit as described above suffers problems mentioned below.

(1) The address information for all the array data used in the vector processing has to be loaded in the address registers incorporated in the vector processing unit in precedence to the start of execution of the vector processing.

However, in order to execute the vector load instruction corresponding to the instruction V1 in the vector object codes shown in FIG. 4b, it is sufficient that the processing of two instructions S2 and S3 in the scalar objects has been completed. It is unnecessary to load completely all the address information.

Since the scalar processing unit and the vector processing unit can be operated in parallel, it will be obvious that the processing can be carried out with high efficiency, if the scalar instruction for loading the address information can be processed in a proper synchronism with the vector instruction which utilizes the address information.

(2) When the result of computation performed by the Vector processing unit is to be referred to by the scalar processing unit, it is necessary for the scalar processing unit to check whether the result has been loaded. However, the scalar processing unit is capable of carrying out only the check as to whether the vector processing unit is operating or in the idle state. Accordingly, in the case of the hitherto known system shown in FIGS. 4a and 4b, even when the result of the summing operation for the array A has been determined through execution of the vector instruction V4, the scalar processing unit is not allowed to refer to the result so long as all the vector instructions V5 to V8 have not been completely executed.

As will be appreciated from the above elucidation, the synchronous communication means effective between the scalar processing unit and the vector processing unit shown in FIG. 2 can neither establish the synchronization nor perform the communication between both the units during the period from the start of the vector processing to the complete end thereof.

With the present invention, it is contemplated to provide means for controlling finely the synchronization and communication among a plurality of processors bearing the master and slave relation to one another, to thereby realize the parallel processings with enhanced efficiency.

The hitherto known synchronizing means is so arranged that the master processor activates the processing in the slave processor and checks whether execution of the activated processing has been completed or not in the slave processor. In contrast, according to the present invention, there can be realized the function for temporarily stopping the activation of a new instruction on the side of the slave processor until a certain event occurs in the master processor, the function of issuing an indication of occurrence of a certain event in the slave processor, and the function of testing the indication by the master processor. Further by providing the indication of activation of instruction being temporarily stopped in the slave processor as well as indication of the occurrence of event in the slave processor in program status words (PSW) on the side of the slave processor, synchronizing means can be implemented in a convenient manner. Besides, at the time of the task switching, the synchronization control information is also stored by recovering the PSW from the saved state.

Now, the invention will be described in detail in conjunction with exemplary embodiments thereof. The processor system referred to in the following description of the embodiment is same as the one shown in FIG. 1. In the processor system shown in FIG. 1, the scalar processing unit corresponds to the master processor, and the slave processing unit corresponds to the vector processor.

According to the illustrated embodiment, a vector processing program status word (hereinafter referred to as VPPSW in abbreviation) is added with two information bits, while the instructions to be dealt with by the scalar processing unit are added with two instructions while those executed by the vector processing unit being added with two instructions. Accordingly, the VPPSW and the added instructions will be briefly explained, being followed by the description of an example of the synchronization control with the aid of the status word and the instructions.

The program status word or PSW is used in most of the conventional processors for holding concentratedly the important information concerning the operation state of the processor, the address of the succeeding instruction and others. In this connection, it is noted that in many instances, the PSW usually includes unused bits. Accordingly, in many cases, these unused bits may be used for the two bits which are added according to the teaching of the invention. In the case of the vector processing unit shown in FIG. 1, the PSW is present. The PSW for the vector processing unit is referred to as VPPSW. Since the details of the format for the VPPSW bears no direct relation to the present invention, description thereof will be unnecessary. According to the teaching of the invention, the VPPSW is added with two bits mentioned below.

(1) Pause Bit (referred to as P-bit in abbreviation)

When this bit is "1", initiation of the processing of a new instruction is temporarily stopped. When this bit becomes "0", the temporary stop or pause state is cleared. It should be mentioned that this bit has only the function to inhibit temporarily the start of execution of a new instruction and exerts no influence to the instruction of which execution has been started as well as the instruction being executed.

(2) Signal Bit (referred to as S-bit in abbreviation)

This bit assumes "1" when the processing of an instruction has been completed in the designated vector processing unit. Usage of this bit will be described later on.

Next, two instructions additionally employed in the vector processing unit will be elucidated below.

(1) VP Pause Instruction (referred to as VPPAU instruction)

When this instruction is executed, the P-bit of the VPPSW (vector processing program status word) assumes "1", whereupon the processing for issuing the instruction succeeding to this VPPAU instruction is stopped temporarily.

(2) Vector Signal Instruction (referred to as VSIG instruction)

Upon completion of the processing of an instruction succeeding to this VSIG instruction, the S-bit of the VPPSW assumes "1".

Next, two instructions additionally employed in the scalar processing unit will be described.

(1) Resume Vector Processing Instruction (referred to as RSMVP)

This instruction is for testing the value of the P-bit of the PSW. When the value of the P-bit is "1", the latter is reset to "0", whereupon activation of the instruction in the vector processing unit is released from the phase state (temporary stop state). When the value of P-bit is "0", the releasing of the vector processing unit from the pause is inhibited until the P-bit assumes "1". Processing of this instruction is terminated by resetting the P-bit to "0" from "1".

(2) Test and Reset P-Bit Instruction (referred to as TRB)

With this instruction, the S-bit of the VPPSW is tested. When the value of S-bit is "1", the processing of this TRB instruction is terminated by resetting the S-bit to "0". When the S-bit assumes the "0", execution of this TRB instruction is inhibited until the S-bit assumes the value "1". Then, by resetting the S-bit to "0", execution of this instruction is terminated.

Next, description will be made in what manner the FORTRAN program illustrated in FIG. 3 is processed by making use of the synchronization means described above.

FIGS. 5a and 5b illustrate object codes used in connection with the FORTRAN program shown in FIG. 3 when the synchronization means described above is employed according to the invention. The object codes include the scalar object codes and the vector object code as in the case of the hitherto known object code system illustrated in FIGS. 4a and 4b. As will be seen from comparison of FIGS. 4a and 4b with FIGS. 5a and 5b, the object codes employed in association with the synchronization control means according to the invention bear close resemblance to those known heretofore. In particular, those instructions are utterly the same which have same scalar instructions ID and same vector instructions ID added at the left to the individual instructions. In the case of the scalar object codes illustrated in FIG. 5a, the RSMVP instruction for the scalar instruction ID-S101, the RSMVP instruction for the scalar instruction ID-S103 and the TRB instruction for the scalar instruction ID-S102 are added, while the TVP instruction and the BC instruction for the scalar instructions ID-S13 and ID-S14, respectively, are deleted. On the other hand, in the case of the vector object codes shown in FIG. 5b, the VPPAU instruction for the vector instruction ID-V101, the VSIG instruction for the vector instruction ID-V102 and the VPPAU instruction for the vector instruction ID-V103 are added. In the following, functions realized by these added instructions will be described in detail.

(1) EXVP instruction for the scalar instruction ID-S12

This instruction is not issued after completion of all the vector processing preparations such as data loading in the address registers and others, but issued at the time point when the setting of the address information for the array B has been completed and when execution of the instruction VL for the vector instruction ID-V1 can be initiated.

(2) RSMVP instruction for the scalar instruction ID-S101

This instruction commands clearing of the temporary pause of instruction activation in the vector processing unit at the time point when the setting of address information for the array C has been completed in succession to the activation of vector processing in response to the EXVP instruction for the scalar instruction ID-S12. In the case of the vector object codes, the VPPAU instruction for the vector instruction ID-V101 is issued in precedence to the VL instruction for the vector instruction ID-V2 which uses the address information of array C, whereby the initiation of execution of the VL instruction for the vector instruction ID-V2 is temporarily stopped. The RSMVP instruction for the scalar instruction ID corresponds to the VPPAU instruction for the vector instruction ID V101 and functions to clear the temporary stop of activation of the VL instruction for the vector instruction ID-V2 upon completed setting of the address information for the array C.

It should be noted that regardless of which of the RSMVP instruction for the scalar instruction ID-S101 and the VPPAU instruction for the vector instruction ID-V101 is executed in precedence, there arises no problem since the scalar processing unit and the vector processing unit operate in parallel independent of each other. More specifically, when the VPPAU instruction for the vector instruction ID-V101 is executed in precedence, the vector processing unit is set to the stand-by state until the RSMVP instruction for the scalar instruction ID-S101 is issued in the scalar processing unit. In reverse, when the RSMVP instruction for the scalar instruction ID-S101 is executed earlier, the scalar processing unit is set to the stand-by state until the VPPAU instruction for the vector instruction ID-V101 is issued in the vector processing unit.

(3) RSMVP instruction for the scalar instruction ID-S103

This instruction commands the clearing of the temporary stop or pause of instruction activation in the vector processing unit at the time point when the setting of address information for the arrays A, Q and P has been completed after the RSMVP instruction for the scalar instruction ID-S101 was issued. In the case of the vector object codes, the VPPAU instruction for the vector instruction ID-V103 is issued in precedence to the VST instruction ID-V5 which uses the address information for the array A, whereby initiation of execution of the VST instruction for the vector instruction ID-V5 is temporarily stopped. The RSMVP instruction for the scalar instruction ID-S103 corresponds to the VPPAU instruction for the vector ID-V103 and serves to clear the temporary stop of instruction succeeding to the vector instruction ID-V5.

It should be mentioned here that several RSMVP instruction may be inserted between the RSMVP instruction for the scalar instruction ID-S101 and the RSMVP instruction for the scalar instruction ID-S103 (with corresponding VPPAU instructions being inserted between the vector object codes) for realizing more fine synchronization between the scalar processing unit and the vector processing unit. However, in view of the fact that processing of the vector instructions V2, V3 and V4 which require longer time for execution when compared with the scalar instruction is started in response to the clearing of the pause in activation of the vector instructions by the RSMVP instruction for the scalar instruction ID-S101, it is considered that enough time is available for processing the scalar instructions S6 to S11 in the meantime. Accordingly, arrangement is adopted such as illustrated in FIG. 5a.

(4) TRB instruction for scalar instruction ID-S102

With this TRB instruction, it is waited until indication of completion of writing of the results of the vector summing operation in the scalar register at the zeroth address is made in order to allow the result of the vector summing operation as placed in the scalar registered at the zeroth address to be referred to after execution of the MVFS instruction for the scalar instruction ID-S15. This TRB instruction corresponds to the VSIG instruction for the vector instruction ID-V102 among the vector object codes. Indication for completion of the writing operation is made with the aid of S-bit of the VPPSW instruction, as described hereinbefore.

(5) VPPAU instruction for vector instruction ID-V101

This instruction serves to stop temporarily the processing for activating the vector instructions until the address information for the array C has been set in the VBR and VIR at the respective zeroth addresses, for allowing the execution of the VL instruction for the vector instruction ID-V2. This temporary stop of activation is indicated by setting the P-bit of the VPPSW instruction to "1". This instruction VPPAU corresponds to the RSMVP instruction for the scalar instruction ID-S101 among the scalar object codes.

(6) VSIG instruction for vector instruction ID-V102

This instruction VSIG serves to set the S-bit of the instruction VPPSW upon completed execution of the VSM instruction (vector summing operation) for the vector instruction ID-V4 which succeeds to this VSIG instruction. Due to provision of this instruction, the result of execution of the VSM instruction can be referred to as early as possible without being subjected to the influence of the other instructions.

(7) VPPAU instruction for vector instruction ID-V103

This VPPAU instruction serves to stop temporarily activation of the vector instruction until address information for the arrays A, Q and P has been completely set, for allowing the VST instruction or VL instruction succeeding to the vector instruction ID-V103 to be executed. This VPPAU instruction corresponds to the RSMVP instruction for the scalar instruction ID-S103 among the scalar objects.

Now, description will be made concerning the efficiency attained with the object codes employed in association with the synchronization control means according to the invention (illustrated in FIGS. 5a and 5b) in comparison with the hitherto known object codes illustrated in FIGS. 4a and 4b with the aid of time charts.

Figure 6:
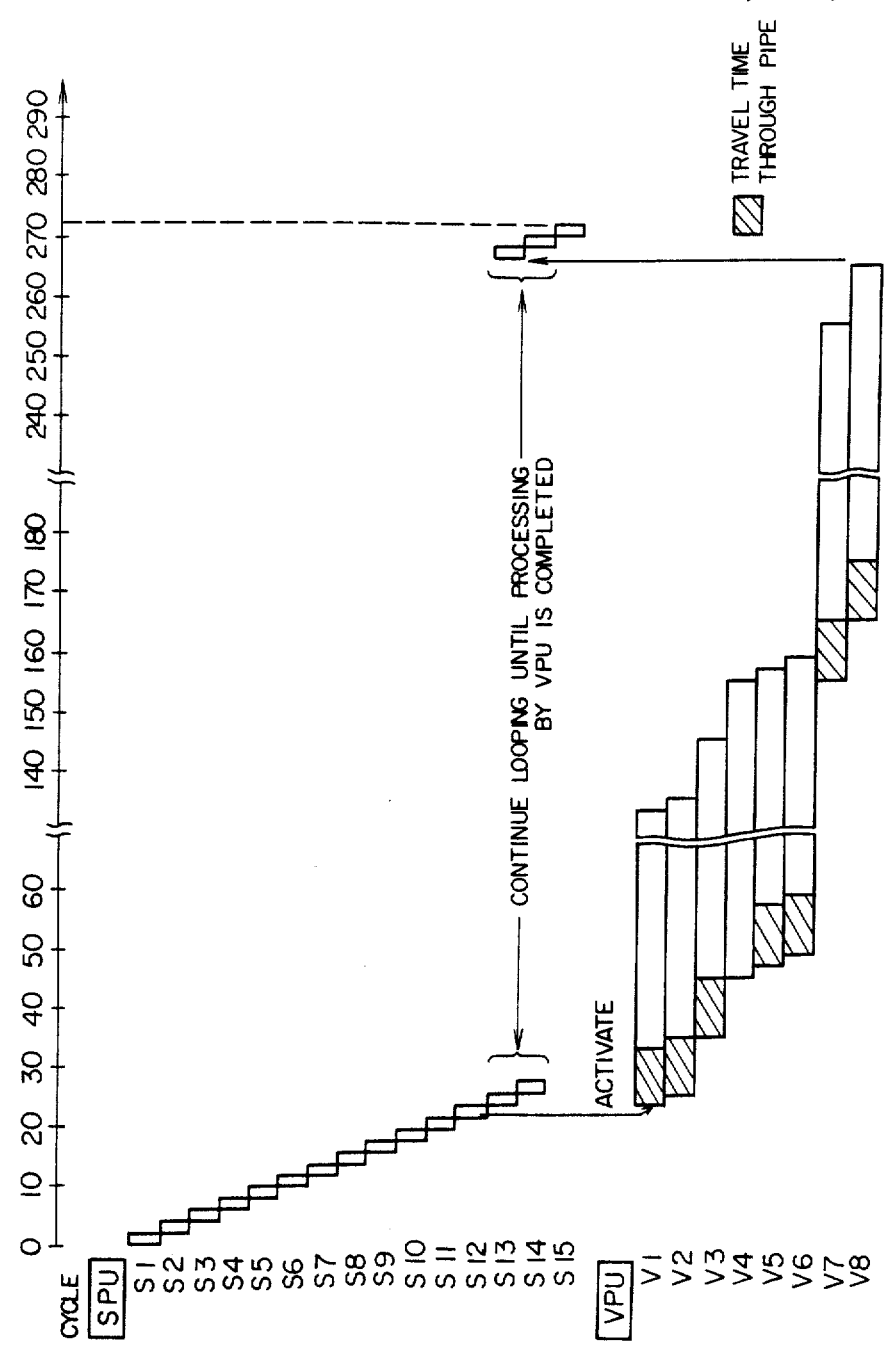
FIG. 6 is a view showing a time chart for illustrating execution of the object codes shown in FIGS. 4a and 4b.
Figure 7:
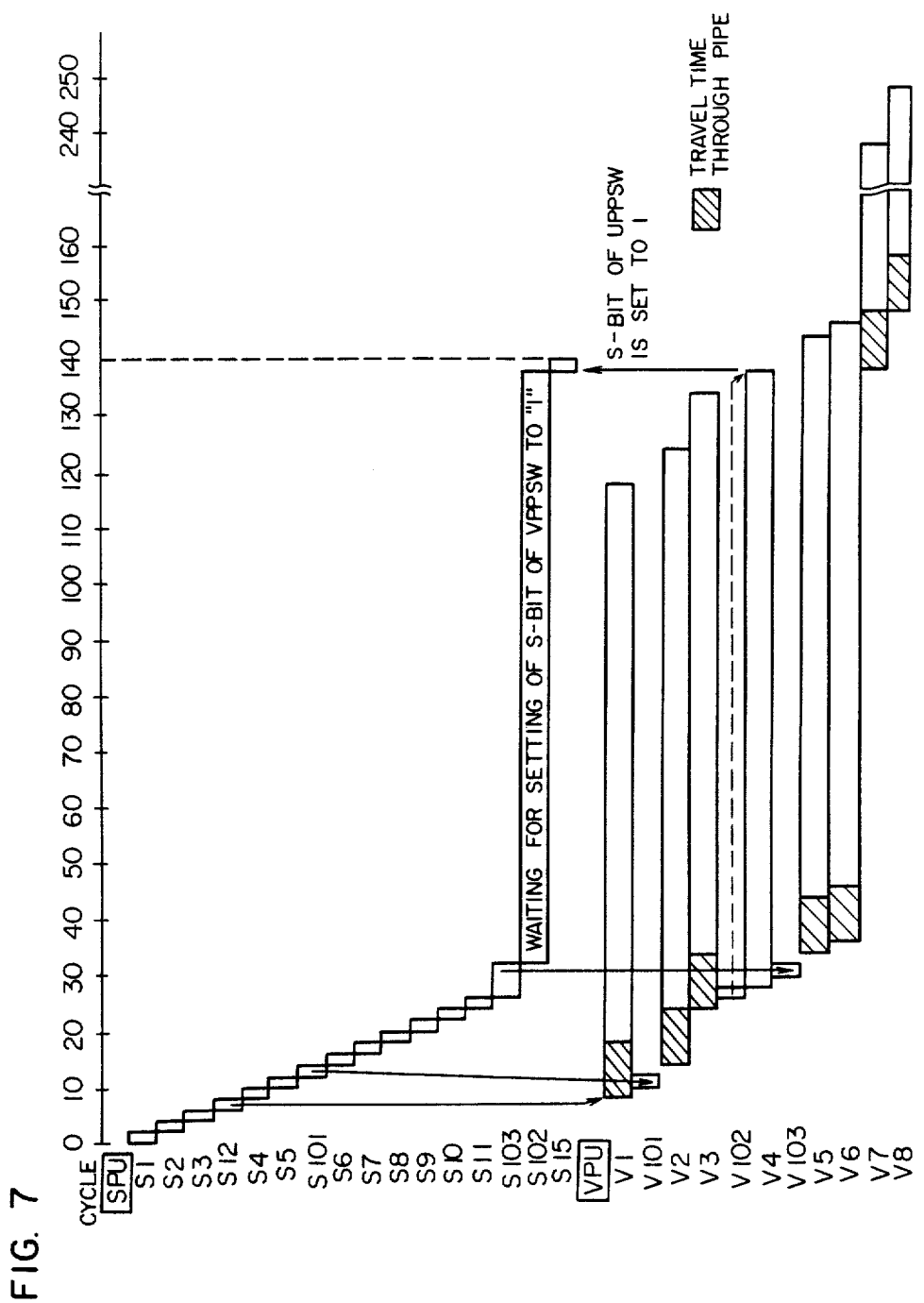
FIG. 7 is a view showing a time chart for illustrating execution of the object codes shown in FIGS. 5a and 5b.

FIG. 6 shows a time chart corresponding to the hitherto known object codes illustrated in FIGS. 4a and 4b, and FIG. 7 shows a time chart corresponding to the object codes utilizing the synchronization control means according to the present invention (shown in FIGS. 5a and 5b). In the time charts shown in FIGS. 6 and 7, the order or sequence in which instructions are decoded or issued is taken along the ordinate while the time base is taken along the abscissa in terms of the number of machine cycles. The order in which instructions are decoded is shown in terms of the scalar instructions ID and the vector instructions ID illustrated in FIGS. 4a and 4b or FIGS. 5a and 5b, wherein an upper half is allocated to the scalar object codes with a lower half allocated to the vector object codes. Preparation of the time charts is based on the assumption mentioned below.

(1) The pipeline processing pitch in the vector processing unit is one cycle.
(2) Although the time taken for the first data to pass through the pipe (often referred to as travel time) in the vector processing varies in dependence on the types of operations, it is assumed that the travel time is ten cycles uniformly.
(3) The number of times the DC-loop in the FORTRAN program shown in FIG. 3 is executed is one hundred. With a single vector operation, one hundred elements are processed. Accordingly, from the assumptions (1) and (2), the time taken for processing one vector instruction amounts to 110 cycles in total which is a sum of 10 cycles taken for obtaining the first result and subsequent 100 cycles taken for obtaining successively one hundred results over 100 cycles.
(4) The time taken for executing the scalar instruction is assumed to be two cycles uniformly.
(5) The time pitch in decoding the scalar instruction or the vector instruction as well as the time pitch in issuing these instructions, respectively, is assumed to be two cycles.
(6) Many of the vector processors adopt speeding-up technique referred to as the chaining. For the details of this technique, reference may be made to Japanese Patent Unexamined Publication No. 58-114274. Among the individual instructions of the vector objects shown in FIGS. 4b and 5b, the chaining can be realized between the vector instruction ID-V1 or ID-V2 and the vector instruction ID-V3, between the vector instructions ID-V6 and ID-V7, and between the vector instructions ID-V7 and ID-V8.

Although the assumptions enumerated above do not reflect the actual parameters in concern of the processor with accuracy, they reflect the characteristics of the vector processor in general and are reasonably adequate for explaining the effects accomplished with the present invention.

From the comparison of the time chart shown in FIG. 6 with the one shown in FIG. 7, the following differences can be seen.
(1) The total processing time is 272 cycles in the case of the conventional technique illustrated in FIG. 6. In contrast, according to the invention, the processing time is shortened to 248 cycles as can be seen in FIG. 7. This difference in the processing time can be explained by the fact that in contrast to the prior art technique in which the vector processing can be initiated only after all the preparatory processings for the vector processing have been completed, the present invention allows the vector processing to be initiated at an earlier time point when only a part of the preparatory processing for the vector processing has been completed.
(2) According to the prior art technique illustrated in FIG. 6, the scalar processing unit must wait for completion of the vector processing for a period which amounts to as long as 239 cycles. This period includes the time taken for processing the vector instructions V5 to V8 for which the scalar processing unit need not await the completion of processing in actuality. In contrast, the corresponding stand-by time of the scalar processing unit is reduced down to 105 cycles in the case of the technique illustrated in FIG. 7.
(3) The result of the summing operation performed by the vector processing unit can be derived at the 272-nd cycle by executing the scalar instruction ID-S15 by the scalar processing unit in the case of the technique illustrated in FIG. 6. In contrast, according to the invention, the corresponding result can be extracted as early as at 140-th cycle.

Next, control logic for implementing the synchronization control means according to the present invention will be described. The control logic is not of a large scale but can be realized by some logic circuits added to the scalar instruction controller 34 and the vector instruction execution controller 44 in the vector processor shown in FIG. 1.

FIG. 8 is a view showing the control logic configuration for implementing the synchronization control means according to the present invention. In FIG. 8, reference numerals 34 and 44 denote a scalar instruction controller and a vector instruction execution controller which are equivalent to those shown in FIG. 1, respectively. At first, description will be directed to the internal structure of the scalar instruction controller 34. A numeral 301 denotes a scalar instruction register for fetching and holding the incoming scalar instruction transmitted over a signal line 310. A numeral 302 denotes a scalar instruction decoding circuit for decoding the scalar instruction held by the scalar instruction register 301. A numeral 303 denotes a scalar instruction activating logic for supplying an activating signal on the basis of the decoded result of the scalar instruction decoding circuit 302 to the functional unit, registers and others participating in the processing of the instruction through a group of signal lines 313. A signal of logic "1" makes appearance on the signal line 311 when the RSMVP instruction is decoded, while a signal of logic "1" is produced on the signal line 312 upon decoding of the TRB instruction. The portion performing the instruction executing processing inclusive of the processing mentioned above on the basis of the decoded information supplied from the instruction decoder circuit 302 constitutes an executing portion.

Next, the internal structure of the vector instruction execution controller 44 will be described. A reference numeral 401 denotes a vector instruction register for fetching and holding the incoming vector instruction transmitted over a signal line 410. A numeral 402 denotes a vector instruction decoding circuit for decoding the vector instruction held in the vector instruction register 401. A numeral 403 denotes a vector instruction activation deciding logic having functions mentioned below. The logic 403 centrally manages the states of the use of the functional units, vector registers and others in the vector processing unit, checks the decoded information of instruction inclusive of information identifying the vector register used for executing the instruction fed from the vector instruction decoding circuit 402 as well as other information, and makes decision as to whether the vector instruction in concern can be activated or not. When the decision results in that the activation is permitted, an activation signal is produced to be supplied through the signal lines 411 to the functional unit, the vector registers and others which participate in the processing of the above mentioned instruction. The signal lines 412 serve to transmit a message that the vector instruction under execution has been ended. Information including the data identifying the vector register used for executing the instruction is transmitted through these signal lines 412 to be inputted to the vector instruction activation deciding logic 403, whereby the information concerning the functional unit, vector register and others used in executing the completed vector instruction is altered. There is produced on the signal line 413 a signal of logic "1" upon decoding of the VPPAU instruction, while the signal of logic "1" is produced on the signal line 414 upon decoding of the VSIG instruction. Numerals 450 and 451 denote registers, respectively. The register 450 is set when the VSIG instruction is decoded to thereby produce logic "1" on the signal line 414. The register 450 in the ON state commands that the information outputted from the vector instruction decoding circuit 402 concerning the instruction decoded subsequently is to be placed in the register 451. Thus, the information concerning the instruction succeeding to the VSIG instruction is held by the register 451. A numeral 452 denotes a comparison circuit for comparing the information concerning the instruction succeeding to the VSIG instruction and held by the register 451 with the information supplied through the signal line 412 concerning the instruction of which execution has been completed. When the information supplied through the signal lines 412 concerns the instruction held in the register 451, the comparison circuit 452 produces logic "1" on the signal line 415. More specifically, upon completion of execution of the instruction succeeding to the VSIG instruction, the logic "1" signal is produced on the signal line 415 to message this fact. A numeral 453 denotes a vector program status word (VPPSW in abbreviation) for holding the status of the program being processed in the vector processing unit. According to the invention, the P-bit and S-bit mentioned hereinbefore are added. The outputted P-bit is inputted to the vector instruction activation deciding logic 403. When the P-bit is "1", this is informed to the vector instruction activation deciding logic 403, whereby activation of the vector instruction is inhibited. A numeral 454 denotes a P-bit registration control logic. A numeral 455 denotes a 5-bit registration control. The portion for performing the instruction executing processing inclusive of the above mentioned processing on the basis of the decoded information transferred from the instruction decoder circuit 402 constitutes an executing section.

Next, functions of the control logics described above will be elucidated in conjunction with the processing of the scalar instructions RSMVP and TRB as well as the vector instructions VPPAU and VSIG.

(1) Function of the P-bit registration control logic

When the VPPAU instruction is decoded by the vector processing unit, this is informed to the P-bit registration control logic 454 by way of the signal line 413. In response, the P-bit is set to "1".

When the RSMVP instruction is decoded by the scalar processing unit, this is informed to the logic 454 through the signal line 311. If the P-bit has the value of "1" at that time, the P-bit is reset to "0". In that case, the signal line 416 is held in the OFF state. Consequently, the subsequent instruction is not suspended from activation in the instruction activating logic 303. The instruction activation deciding logic 403 releases the vector instruction from the activation inhibiting state in response to the resetting of the P-bit to "0". On the other hand, when the value of the P-bit is "0", the signal line 416 is set to the ON state, and this is informed to the scalar instruction controller 303 for suspending temporarily the activation of the scalar instruction (i.e. the RSMVP instruction). Subsequently, when the VPPAU instruction is decoded in the vector processing unit and the corresponding message is issued, the signal line 416 is set to the OFF state to release the scalar instruction from the suspended state. At this time, the value of P-bit is left to be "0".

When both the RSMVP instruction and the VPPAU instruction are simultaneously decoded, the P-bit is reset to "0". Neither the scalar instruction activating logic 303 nor the vector instruction activation deciding logic 403 suspends the instruction from activation.

(2) Function of the S-bit registration logic 455

Upon completion of the processing of the instruction succeeding to the VSIG instruction having been processed in the vector processing unit, this is informed to the registration control logic 455 by way of the signal line 415. In response, the registration control logic 455 sets the S-bit to "1". When the TRB instruction is decoded in the scalar processing unit, corresponding information is given to the logic 455 through the signal line 312. When the value of S-bit is "1" at that time, the S-bit is reset to "0". In that case, the signal line 417 is held in the OFF state, whereby the activation of the succeeding instruction is protected from being suspended in the scalar instruction activation logic 303. On the other hand, the vector instruction activation deciding logic 403 performs operation for activating the succeeding instruction regardless of the value assumed by the S-bit. When the value of S-bit is "0", the signal line 417 is turned on, and this status is informed to the scalar instruction controller 303 to thereby temporarily suspend the activation of the scalar instruction (i.e. the TRS instruction). Subsequently, the processing of the instruction succeeding to the VSIG instruction comes to end, in response to which the signal line 417 is set to the OFF state, whereby the scalar instruction is released from the activation suspended state. At this time, the value of S-bit is left to be "0".

When the TRB instruction occurs simultaneously with the completion of execution of the instruction succeeding to the VSIG instruction, the S-bit is reset to "0". In the scalar instruction activating logic 303, the activation of the succeeding instruction is prevented from being suspended.

With the circuit arrangement described above with reference to FIG. 8, the concept of synchronization control according to the invention can be realized.

In the case of the illustrated embodiments, discussion has been made in conjunction with the vector processor. However, it should be understood that the application of the present invention is never restricted to the vector processor, but can be applied to synchronization control between processors of any types so far as they are in the master-slave relation, such as between the scalar processing unit and an array processing unit, by way of example.

While particular embodiments of the invention have been shown and described, it will be obvious to those skilled in the art that various changes and modifications may be made without departing from the spirit and scope of the present invention in its broader aspects.

We claim:

1. A multi-processor system comprising a first processor and a second processor connected to said first processor for supplying said first processor with data required for execution of instructions by said first processor;

said first processor including a first instruction register for holding an instruction to be executed thereby; first decoding means connected to said first instruction register for decoding the instruction held by said first instruction register; first activation control means connected to said first decoding means for controlling activation of the decoded instruction; indication means connected to said activation control means for indicating thereto an operation state of said first processor;

a registration control means connected to respond to decoding of a pause instruction by said first decoding means for setting at said indication means a pause indication indicating that said first processor is in a pause state;

said first activating control means including means connected to respond to said pause indication for suspending activation of a succeeding instruction decoded after the pause instruction so long as said pause indication is issued by said indication means;

said second processor including a second instruction register for holding an instruction to be executed thereby; second decoding means connected to said second instruction register for decoding the instruction held by said second instruction register; and second activation control means connected to said second decoding means for controlling activation of the instruction decoded by said second decoding means;

said registration control means including means connected to said second decoding means and responsive to decoding of a pause clearing instruction by said second decoding means and to indication of a pause state by said indication means for resetting said pause indication and for supplying to said second activation control means a completion signal indicating that said pause indication has been reset and responsive to the decoding of a pause clearing instruction and to indication of a non-pause state by said indication means for supplying to said second activation control means an incompletion signal; and said second activation control means including means responsive to said incompletion signal for suspending activation of a succeeding instruction decoded after decoding of the pause clearing instruction by said second decoding means until said completion signal is received by said second activation control means.

2. A multi-processor system according to claim 1, wherein said indication means of said first processor includes a storage area for indication of the operating state within a register for holding a program status word for said first processor.

3. A multi-processor system comprising a first processor and a second processor connected to said first processor for supplying to said first processor data required for execution of instructions by said first processor;

said first processor including a first instruction register for holding an instruction to be executed thereby; first decoding means connected to said first instruction register for decoding the instruction held by said first instruction register; first activation control means connected to said first decoding means for controlling activation of the decoding instruction; indication means connected to said first activation control means for indicating thereto an operation state of said first processor;

register means connected to said first decoding means and responsive to the decoding of an indication instruction wherein said indication instruction causes decoded information of a succeeding instruction to be temporarily stored in said register means; detect means for detecting completion of execution of the succeeding instruction, registration control means connected to respond to said detect means for setting at said indication means an indication of execution completion; and said second processor including a second instruction register for holding an instruction to be executed thereby; second decoding means connected to said second instruction register and said registration control means for decoding the instruction held in said second instruction register; and second activation control means connected to said second decoding means for controlling activation of the instruction decoded thereby;

said registration control means including means responsive to decoding of an indication resetting instruction by said second decoding means and indication of execution completion by said indication means for resetting said execution completion indication and for supplying said second activation control means with a completion signal indicating that said indication of execution completion has been reset and responsive to the decoding of an indication resetting instruction and indication of a non-execution completion state by said indication means for supplying to said second activation control means an incompletion signal;

said second activation control means being responsive to said incompletion signal to thereby suspend activation of a succeeding instruction decoded after the indication resetting instruction by said second decoding means until said completed signal is received.

4. A multi-processor system according to claim 3, wherein said first processor is a vector processor, and said means for identifying completion of the succeeding instruction includes second storing means for storing the result of decoding of said succeeding instruction, and comparison means for comparing the content stored in said second storing means with the information concerning the execution completion of said succeeding instruction to thereby identify the execution completion of said succeeding instruction.

5. A multi-processor system according to claim 3, wherein said indication means includes a storage area for indication of the operating state within a register for holding a program status word for said first processor.

6. A multi-processor system comprising a first processor and a second processor connected to said first processor for supplying said first processor with data required for execution of instructions by said first processor;

said first processor including a first instruction register for holding an instruction to be executed thereby; first decoding means connected to said first instruction register for decoding the instruction held by said first instruction register; first activation control means connected to said first decoding means for controlling activation of the decoded instruction; indication means connected to said activation control means for indicating thereto an operation state of said first processor; first registration control means connected to respond to decoding of a pause instruction by said first decoding means for setting at said indication means a pause indication indicating that said first processor is in a pause state, and said first activation control means including means connected to respond to said pause indication for suspending activation of a succeeding instruction decoded after the pause instruction so long as said pause indication is issued by said indication means; register means connected to said first decoding means for storing temporarily an indication command resulting from the decoding of an indication instruction; detect means for identifying completion of execution of the succeeding instruction, and second registration control means connected to respond to said detect means for setting at said indication means an indication of execution completion; and said second processor including a second instruction register for holding an instruction to be executed thereby; second decoding means connected to said second instruction register and said first and second registration control means for decoding the instruction held in said second instruction register; and second activation control means connected to said second decoding means for controlling activation of the instruction decoded thereby;

said first registration control means including means responsive to decoding of a pause clearing instruction by said second decoding means and to indication of a pause state by said indication means for resetting said pause indication and for supplying said second activation control means with a completion responsive to the decoding of a pause clearing instruction and : to indication of a non-pause state by said indication means for supplying said second activation control means with an incompletion signal;

said second registration control means including means responsive to decoding of an indication resetting instruction by said second decoding means and to indication of execution completion by said indication means for resetting execution completion indication and for supplying said second activation control means with a completion signal indicating that said indication of execution completion has been reset and responsive to the decoding of the indication resetting instruction and indication of a non-execution completion state by said indication means for supplying said second activation control means with said incompletion signal;

said second activation control means responding to said incompletion signal either from said first or second registration control means to thereby suspend activation of a succeeding instruction decoded after decoding of the clearing instruction or indication resetting instruction by said second decoding means until said completion signal is received.

7. A method of executing instructions in a multiprocessor system comprising a first processor and a second processor connected to said first processor for supplying said first processor with data required for execution of instructions by said first processor, said method comprising the steps of:

setting an indication of a pause state of said first processor in response to decoding and execution of a pause instruction by said first processor, and suspending activation of a succeeding instruction in said first processor decoded after decoding and execution of the pause instruction until said indication of a pause state is reset; and resetting said indication of a pause state in said first processor by said second processor in response to decoding and execution of a pause clearing instruction by said second processor supplying from said first processor to said second processor either a completion signal indicating that said pause state has been reset in said first processor or an incompletion signal indicating that said pause state has not been reset in said first processor; and causing said second processor to suspend activation of a succeeding instruction after the pause clearing instruction in said second processor until said completion signal is received.

8. A method of executing instructions in a multiprocessor system comprising a first processor and a second processor connected to said first processor for supplying said first processor with data required for execution of instructions by said first processor, said method comprising the steps of:

identifying completion of execution of an instruction succeeding an execution completion indication instruction in response to decoding and execution of the execution completion indication instruction included in instructions to be executed by said first processor, and setting an indication of execution completion of said succeeding instruction; and resetting said execution completion indication in said first processor by said second processor, in response to decoding and execution of an indication resetting instruction included in instructions to be executed by said second processor and the indication of execution completion, supplying from said first processor to said second processor either a completion signal indicating that said indication of execution completion has been reset in response to decoding and execution of the indication resetting instruction and resetting of execution completion indication or an incompletion signal in response to decoding and execution of an indication resetting instruction and non-execution completion indication; and suspending activation of a succeeding instruction after the resetting instruction in said second processor until said completion signal is received.

9. A method of executing instructions in a multiprocessor system comprising a first processor and a second processor connected to said first processor for supplying said first processor with data required for execution of instructions by said first processor, said method comprising the steps of:

setting indication of a pause state of said first processor in response to decoding and execution of a pause instruction included in instructions to be executed by said first processor, and suspending activation of a succeeding instruction decoded after the decoding and execution of the pause instruction until said indication of a pause state is set;

resetting said indication of a pause state in said first processor by said second processor in response to decoding and execution of a pause clearing instruction , by said second processor supplying from said first processor to said second processor either a completion signal indicating that said pause state has been reset in said first processor or an incompletion signal indicating that said pause state has not been reset; and causing said second processor to suspend activation of a succeeding instruction after the clearing instruction in said second processor until said completion signal is received;

identifying completion of execution of the instruction succeeding an execution completion indication instruction in response to decoding and execution of the execution completion indication instruction included in instruction to be executed by said first processor, and setting an indication of execution completion of said succeeding instruction; and resetting said execution completion indication in said first processor by said second processor, in response to decoding and execution of an indication resetting instruction included in indication of execution completion, and supplying from said first processor to said second processor either a completion signal indicating that said indication of execution completion has been reset in response to decoding and execution of the indication resetting instruction and resetting of said indication of execution completion or an incompletion signal in response to decoding and execution of the indication resetting instruction and indication of non-execution completion to thereby suspend activation of a succeeding instruction after the resetting, instruction in said second processor until said completion signal is received.

* * * * *